(12) United States Patent
Roth

(10) Patent No.: US 7,162,837 B1
(45) Date of Patent: Jan. 16, 2007

(54) STRUCTURAL MEMBER STABILIZING SYSTEM

(76) Inventor: Steven A. Roth, P.O. Box 0933, Alamo, CA (US) 94507

( * ) Notice: Subject to any disclaimer, the term of this patent is extended or adjusted under 35 U.S.C. 154(b) by 300 days.

(21) Appl. No.: 10/645,203

(22) Filed: Aug. 21, 2003

(51) Int. Cl.
*E04H 12/34* (2006.01)
(52) U.S. Cl. .............................. 52/120; 52/698; 52/705; 52/706
(58) Field of Classification Search .................. 52/708, 52/710, 704
See application file for complete search history.

(56) References Cited

U.S. PATENT DOCUMENTS

| | | | | | |
|---|---|---|---|---|---|
| 1,933,536 | A | * | 11/1933 | Awbrey | ...................... 52/708 |
| 1,933,563 | A | * | 11/1933 | Montford | ...................... 378/201 |
| 3,884,008 | A | * | 5/1975 | Miller | ........................... 52/699 |
| 4,353,519 | A | * | 10/1982 | Bogart | .......................... 248/72 |
| 5,224,246 | A | * | 7/1993 | Royball | ..................... 24/129 R |
| 6,026,545 | A | | 2/2000 | Duggan | |
| 6,237,300 | B1 | * | 5/2001 | Carne et al. | ................... 52/715 |

\* cited by examiner

*Primary Examiner*—Richard E. Chilcot, Jr.
*Assistant Examiner*—Colleen Quinn
(74) *Attorney, Agent, or Firm*—Thomas R. Lampe

(57) ABSTRACT

A bracket connects a structural member to a structural element to stabilize the structural member against movement. The bracket includes connector portions for connecting the bracket to tensioned stabilizing cables or other structural stabilizing elements and one or more bearing elements which bear against the structural member to prevent relative rotational movement between the bracket and the structural member.

8 Claims, 8 Drawing Sheets

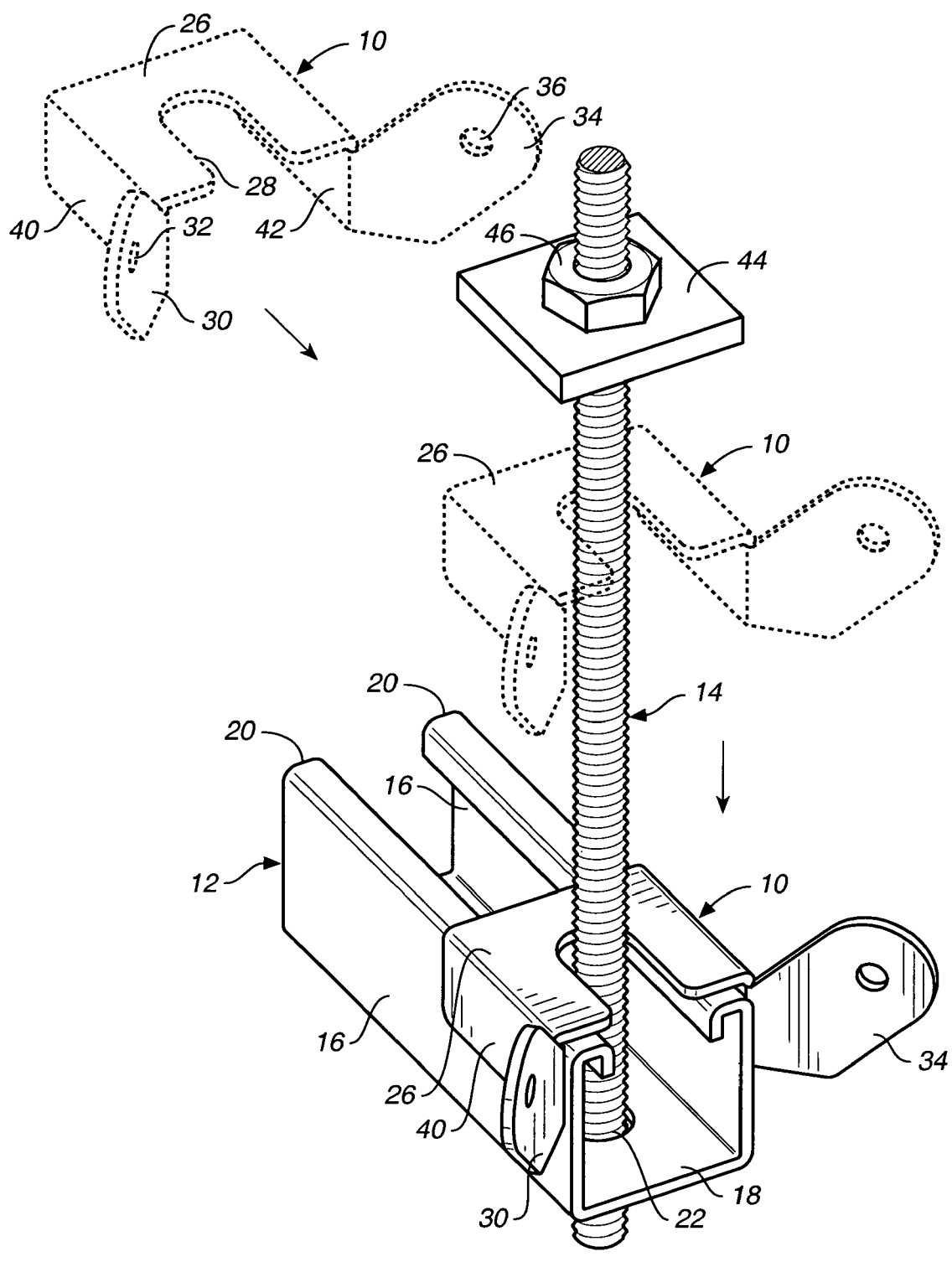
FIG._1

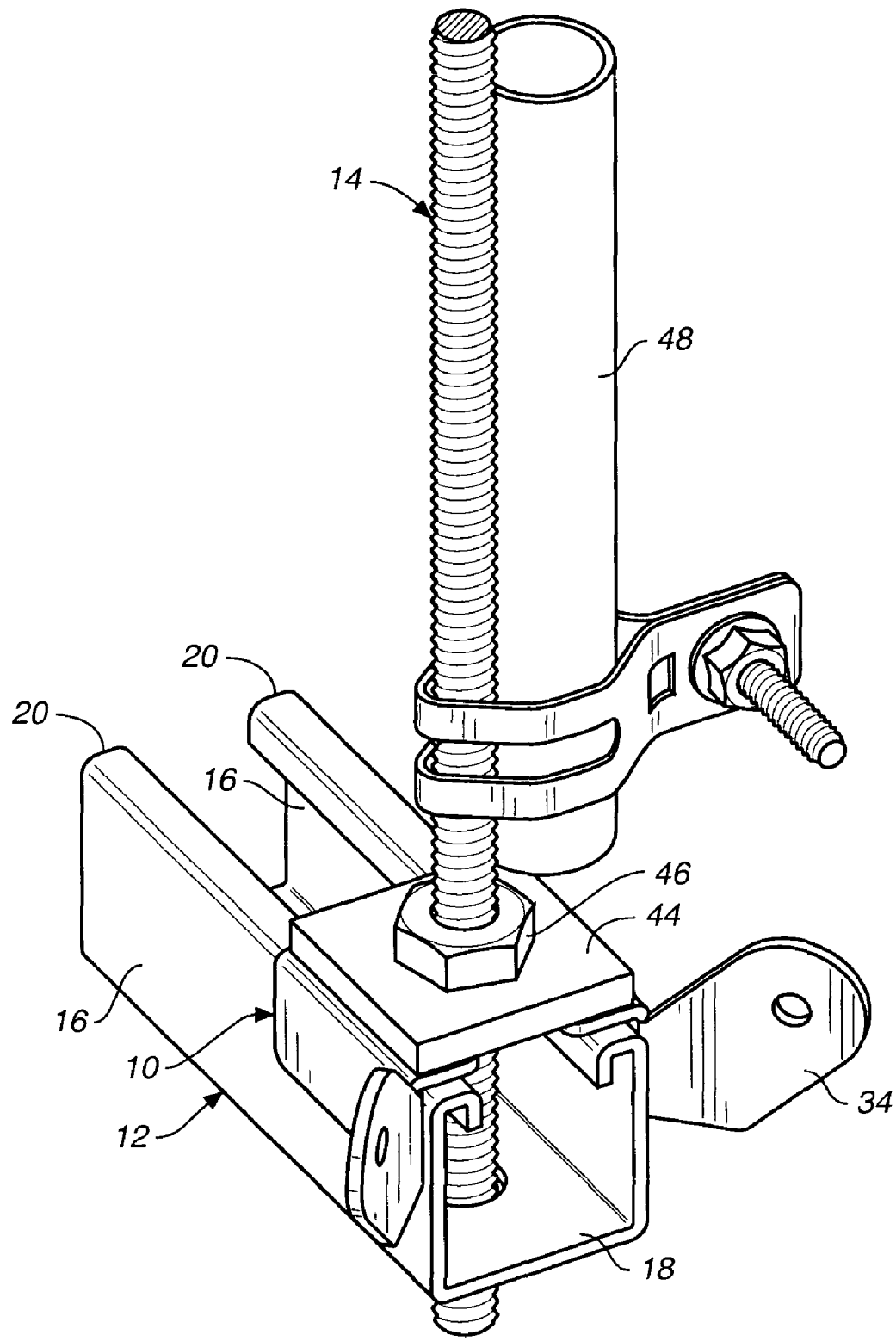
FIG._2

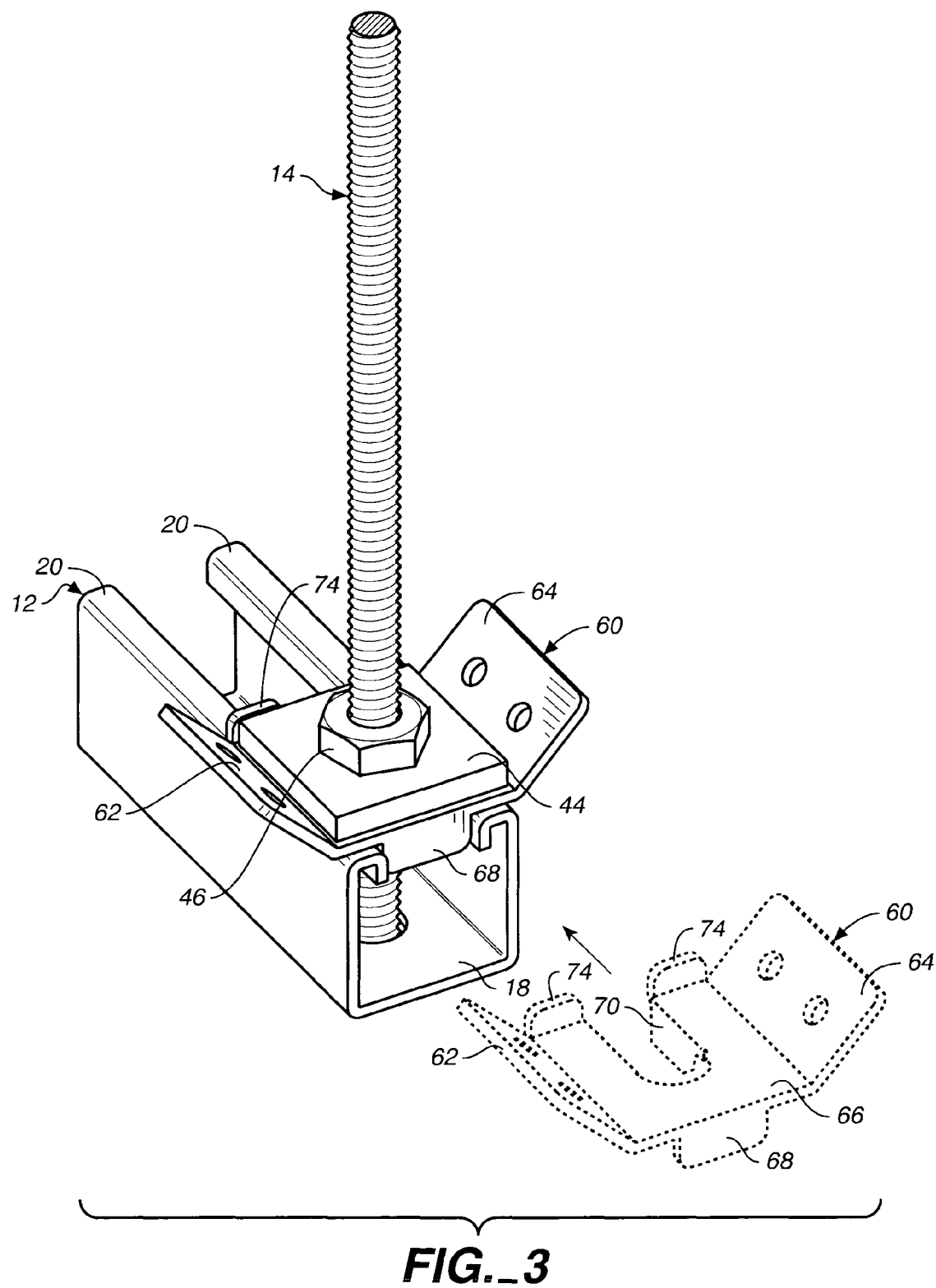
FIG._3

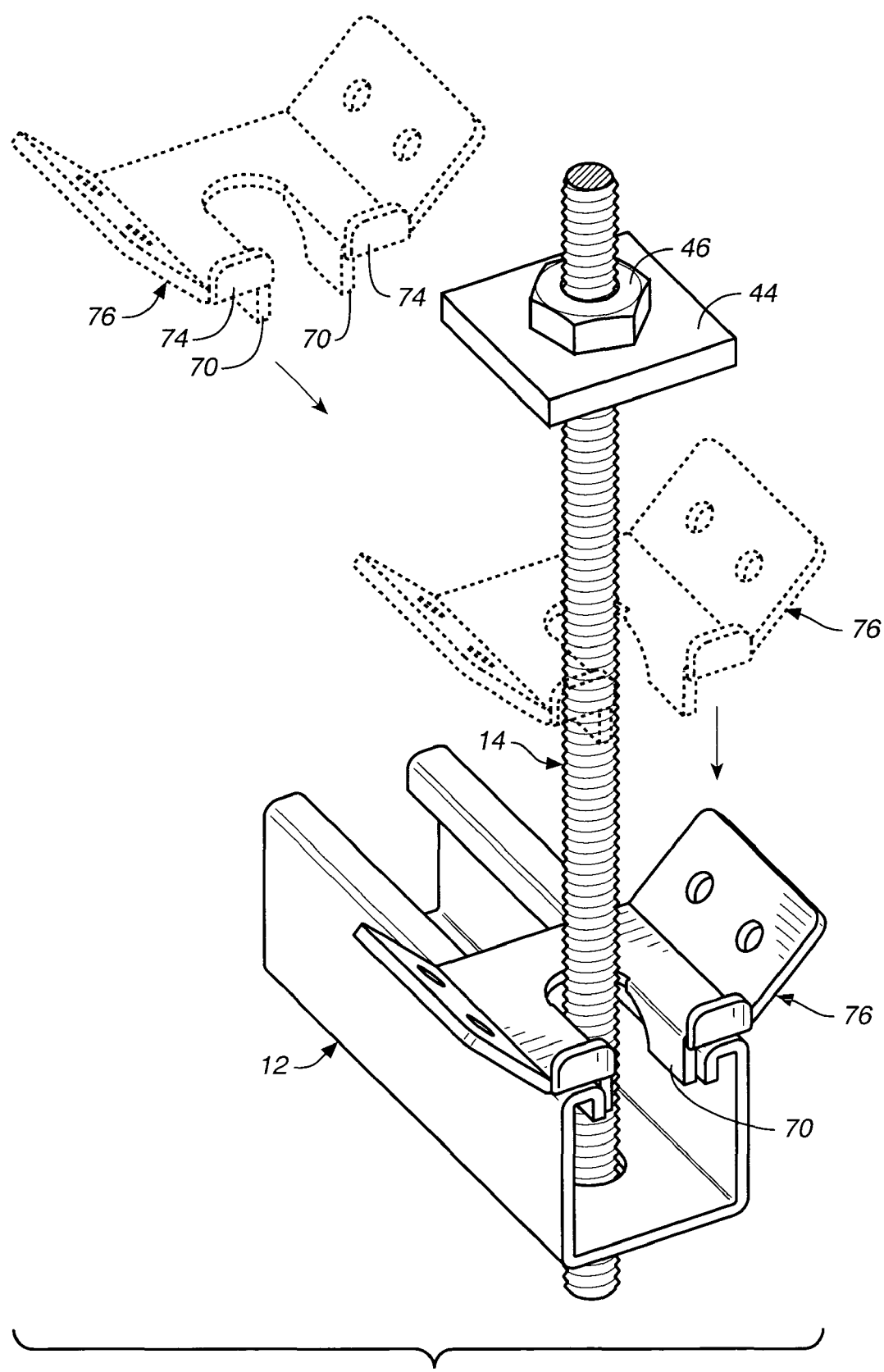
FIG._4

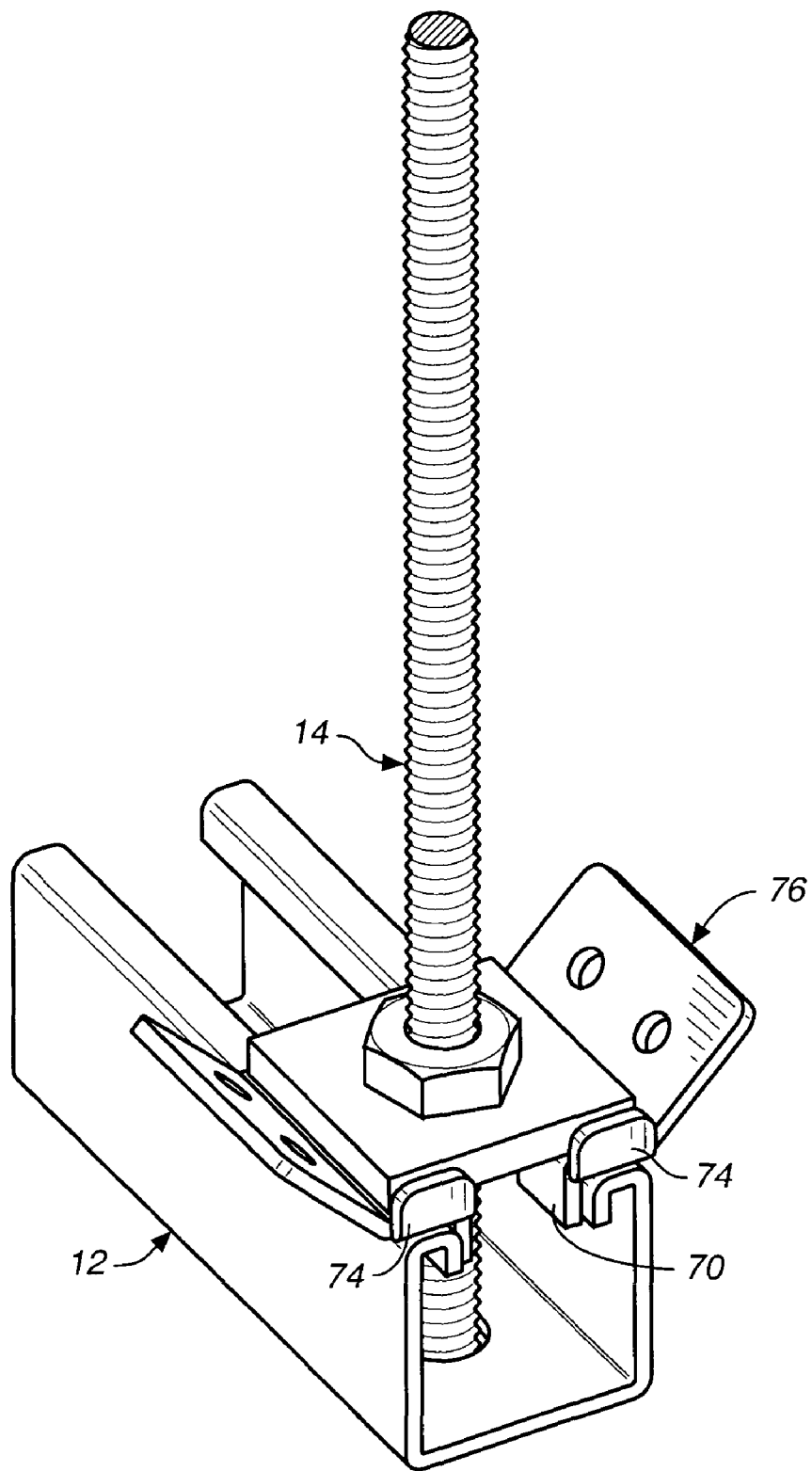
FIG._5

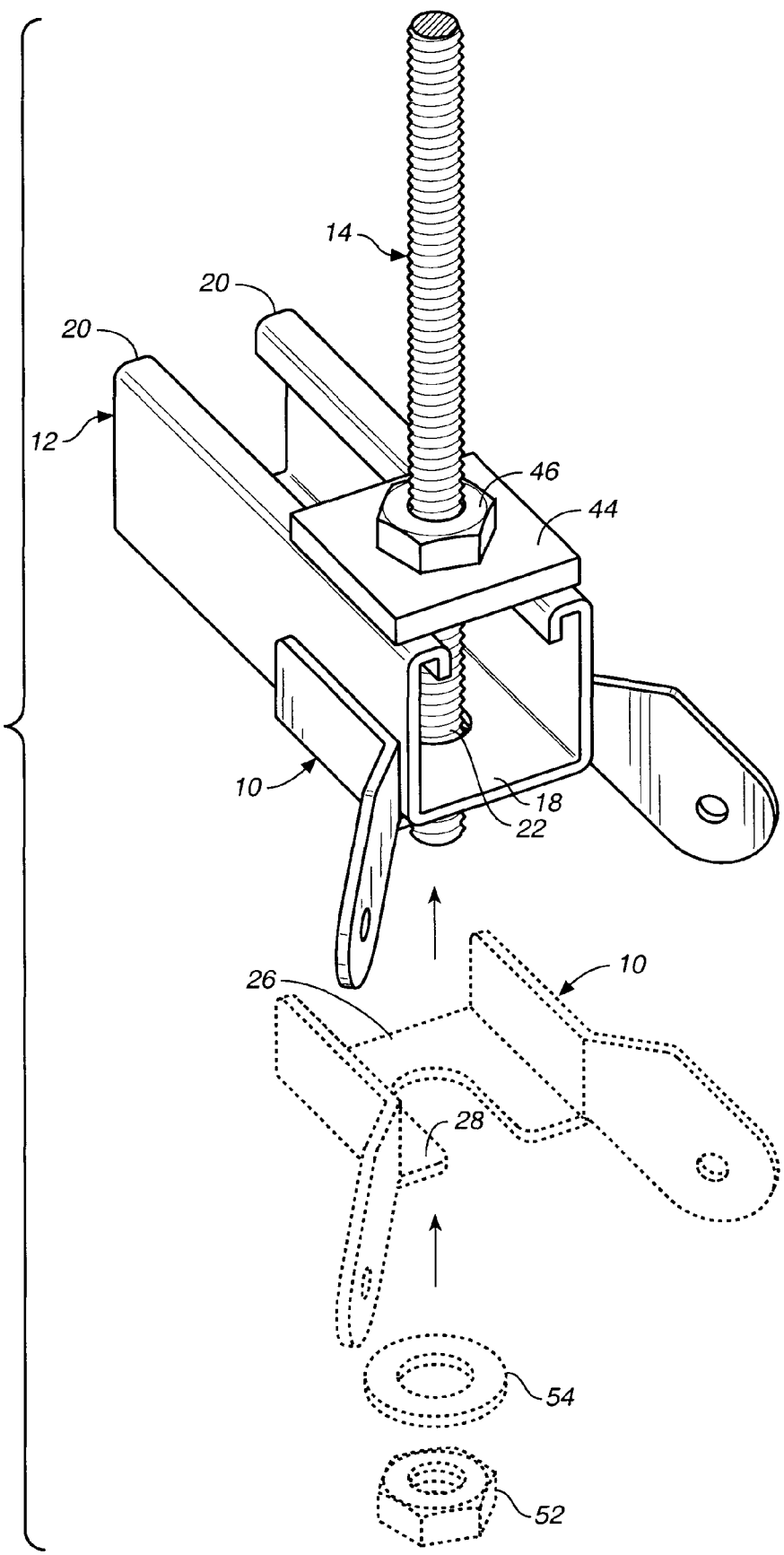
FIG._6

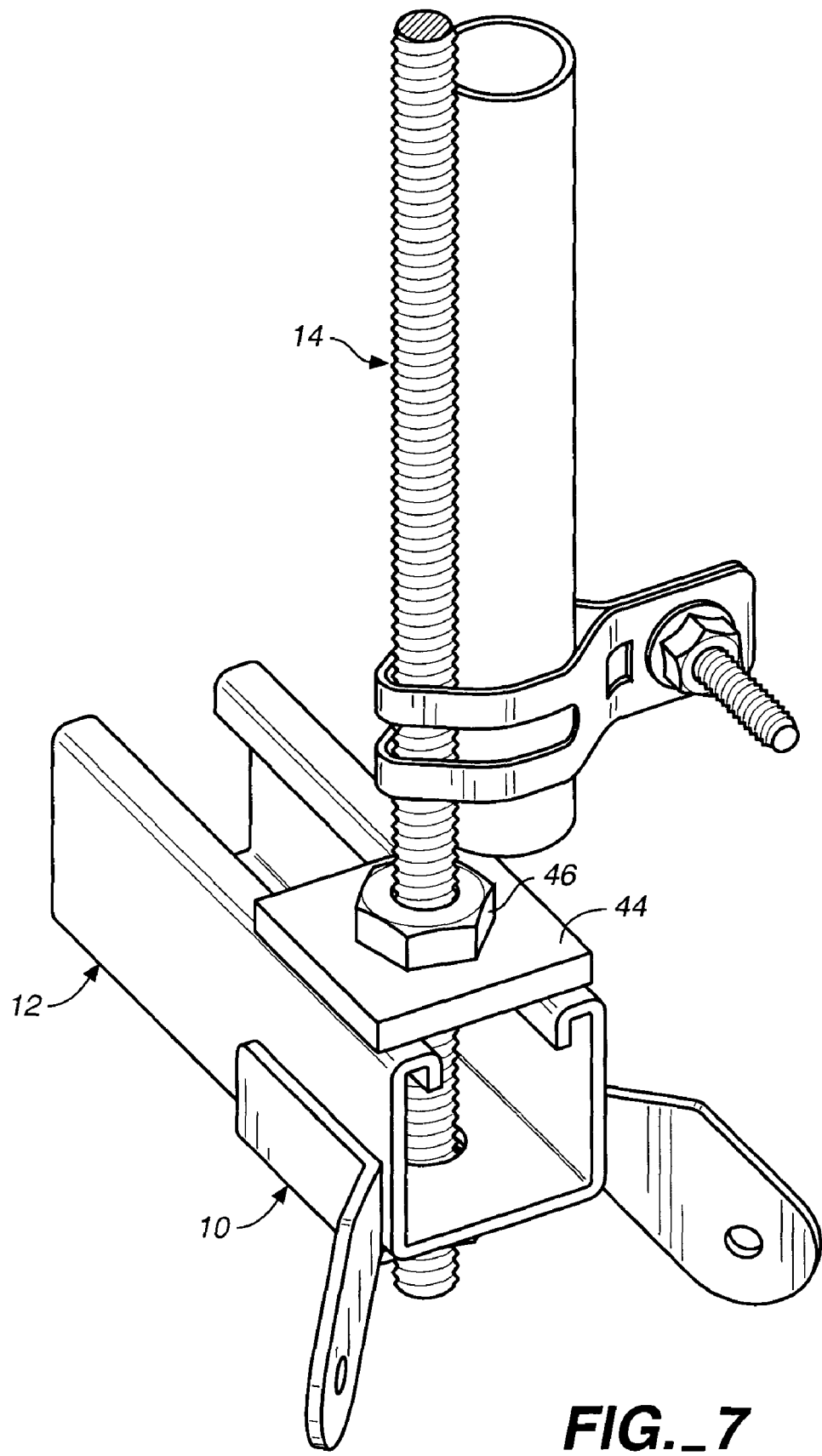
FIG._7

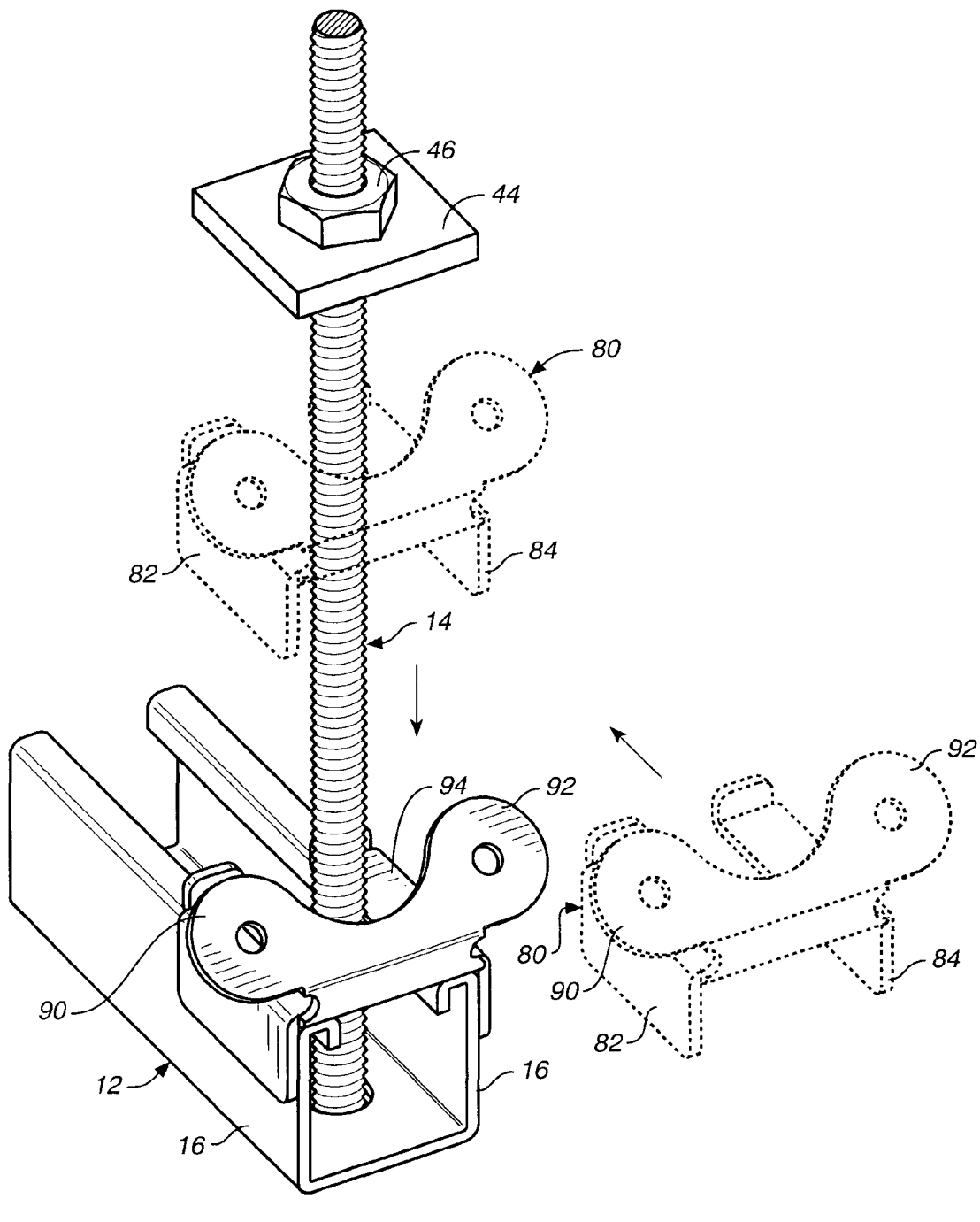
FIG._8

STRUCTURAL MEMBER STABILIZING SYSTEM

TECHNICAL FIELD

This invention relates to a bracket of integral construction for connecting a structural member to a structural element and for stabilizing the structural member against movement when connected thereto. The invention has particular application to connecting a channel member to a hanger rod.

BACKGROUND OF THE INVENTION

U.S. Pat. No. 6,026,545, issued Feb. 22, 2000, discloses a one-piece restraint bracket used with cables to brace a supported object against movement. The bracket is generally L-shaped to define a flattened, apertured central portion with two wing portions generally at right angles to each other, apertured at their free ends and joined to the flattened central portion. Each wing is elevated or upwardly bent from the plane of the central portion. Cables are attached to the wing portions and are tensioned to brace the bracket against movement when there is seismic activity or the like.

With the device of U.S. Pat. No. 6,026,545 unequal forces can be applied to the bracket during seismically induced motion or other movement, causing rotation of the fitting or bracket relative to the object it supports. This can cause loosening of the bracket and cause undesirable stresses to be exerted on the bracket and the object. Any deviation of non-perfect alignment between the bracket apparatus and the cables can result in this rotational or twisting action. In addition, the bracket of U.S. Pat. No. 6,026,545 must be of relatively heavy gauge metal to accommodate the forces exerted thereon.

DISCLOSURE OF INVENTION

The present invention provides an arrangement whereby a bracket of integral construction will not rotate relative to the channel member or other structural member with which it is associated. The bracket serves to transfer load caused by the associated cables to the channel member or other structural member to which the bracket is connected. This enables the bracket to be constructed of thinner gauge material than would otherwise be the case. The arrangement of the present invention allows the structural member and the bracket to remain in fixed position even if the cables are not perfectly aligned with apertures of the bracket.

The bracket of the present invention is of integral construction and is for connecting a structural member to a structural element and also for stabilizing the structural member against movement when connected thereto.

The bracket includes a bracket base defining a bracket base opening for receiving the structural element and including a bracket base surface for bearing against the structural member at a first location on the structural member.

A first connector portion extends away from the bracket base in a first direction and defines an aperture for interconnecting the first connector portion to a first stabilizing cable under tension.

A second connector portion extends away from the bracket base in a second direction and defines an aperture for interconnecting the second connector portion to a second stabilizing cable under tension.

The bracket also includes a bearing element connected to the bracket base and including a bearing element surface for bearing against the structural member at a second location on the structural member. The bearing element surface is angularly disposed relative to the bracket base surface and transfers force from the bracket to the structural member when bearing against the structural member to prevent relative rotational movement between the bracket and the structural member.

Other features, advantages and objects of the present invention will become apparent with reference to the following description and accompanying drawings.

BRIEF DESCRIPTION OF DRAWINGS

FIG. 1 is a perspective view illustrating a bracket constructed in accordance with the teachings of the present invention in three alternative positions (two shown in dash lines) relative to a hanger rod and a channel member and illustrating steps carried out during installation of the bracket on the hanger rod and channel member;

FIG. 2 shows a nut and washer securing the bracket in place and also showing a securement strap and mechanical fasteners employed with the strap to secure the hanger rod to a stiffener;

FIG. 3 is a perspective view illustrating an alternative embodiment of bracket in installed condition on a channel member and hanger rod and also in an alternative position prior to installation, the latter depicted in dash lines;

FIG. 4 is a view similar to FIG. 1, but illustrating a third embodiment of bracket, the bracket being shown in positions it assumes prior to, during and after installation on its associated hanger rod and channel member, the first two positions depicted in dash lines;

FIG. 5 is an enlarged, perspective view of the bracket of FIG. 4 engaged by a washer, a nut on the threaded hanger rod causing the washer to bear against the bracket and the bracket to bear against the channel member;

FIG. 6 is a perspective view illustrating installation of the bracket embodiment of FIG. 1 with the bracket base positioned under the bottom wall of the channel member, the bracket shown in two alternative positions, one just prior to installation of the bracket on the channel member depicted in dash lines and the other in solid lines with the bracket engaging the channel member;

FIG. 7 is a view similar to FIG. 2, but showing the bracket of FIGS. 1, 2 and 6 secured to the underside of the channel member, the hanger rod being braced; and FIG. 8 is a view similar to FIG. 1, but illustrating a fourth bracket embodiment.

MODES FOR CARRYING OUT THE INVENTION

Referring now to FIGS. 1 and 2, a bracket 10 constructed in accordance with the teachings of the present invention is illustrated. The bracket is of integral construction and is utilized to connect a structural member to a structural element and for stabilizing the structural member against movement when connected thereto.

In this instance, the structural member is a conventional open-ended channel member 12 and the structural element is a conventional threaded hanger rod 14. It will be understood that the hanger rod 14 depends downwardly from a ceiling or other building structure (not shown).

The open-ended channel member 12 has two side channel member walls 16, a bottom channel member wall 18 and inturned lips 20 at the tops of the side channel member walls defining an elongated opening communicating with the interior of the channel member. An aperture 22 in the bottom channel member wall receives the hanger rod, as shown.

The bracket 10 includes a bracket base 26 defining a bracket base opening in the form of a slot 28 extending inwardly from and open at one of the edges of the bracket base, the bracket base being in the form of a plate. Slot 28 enables the bracket to be slid in place on the hanger rod from a side of the hanger rod, as illustrated in FIG. 1 which shows the bracket in three representative alternative positions.

The bracket base 26 lower surface bears against the channel member 12 at a first location on the channel member, namely on the inturned lips 20.

The bracket also includes a first connector portion 30 which extends away from the bracket base in a first direction and defines an aperture 32 for interconnecting the first connector portion to a stabilizing element such as a first stabilizing cable (not shown) under tension.

The term "cable" as employed herein refers to any type of elongated, flexible connector element.

A second connector portion 34 extends away from the bracket base in a second direction and defines an aperture 36 for interconnecting the second connector portion to a second stabilizing element such as a stabilizing cable (not shown) under tension.

The bracket 10 includes a first bearing element or plate 40 including an inner first bearing element surface for bearing against the channel member 12 at a second location on the channel member. The first bearing element surface is angularly disposed relative to the lower bracket base surface and is for the purpose of transferring force from the bracket to the channel when bearing against the channel member to prevent relative rotational movement between the bracket and the channel member. More particularly, the bearing element 40 engages one of the side walls 16 of the channel member.

The bracket also includes a second bearing element 42 in the form of a plate connected to the bracket base and spaced from the first bearing element 40. The second bearing element has a second bearing element inner surface for bearing against the channel member at a third location thereon, namely, against the other channel member side wall 16. The inner second bearing member surface is angularly disposed relative to the bracket base surface and is for transferring a force from the bracket to the channel member when bearing against the channel member to prevent relative rotational movement between the bracket and the channel member. The first and second connector portions 30, 34 are directly integrally attached to the first and second bearing element 40, 42, the first and second connector portions flaring outwardly away from one another.

To secure the bracket 10 in place, a square washer 44 is provided on hanger rod 14, with a nut 46 being utilized to clamp the washer 44 against the bracket base 26, as shown in FIG. 2, it being understood that a second nut (not shown) is threaded onto the lower end of the hanger rod below bottom channel member wall 18.

It will be appreciated that the first and second bearing elements or plates 40, 42 lock the bracket and the channel member against relative rotational movement and transfer forces from the bracket to the channel member when uneven or misaligned pulling forces are imposed thereon by the tensioned cables.

In the arrangement illustrated, a stiffener member 48 is applied along the length of hanger rod 14 and held in place by a deformable connector strip 50 and associated connector hardware to provide additional stability to the hanger rod.

FIGS. 6 and 7 show the bracket 10 connected to the channel member and the hanger rod in a somewhat different manner. In this instance, the bracket base 26 is located under and bears against the bottom channel member wall 18, the bracket base surface being maintained in position by a nut 52 and washer 54 disposed about the lower end of the hanger rod 14. The hanger rod 14 projects upwardly through aperture 22 in the bottom channel member wall through the interior of the channel member and through the elongated opening defined by the channel member inturned lips 20. A square washer 44 is clamped against the lips by nut 46.

FIG. 3 illustrates an alternative embodiment of bracket, bracket 60, shown in one position (depicted by dash lines) prior to installation on a channel member 12 and a second position wherein it is connected to the channel member. In this arrangement, first and second connector portions or plates 62, 64 define obtuse angles with the bracket base 66 and are integrally connected to opposed side edges thereof. Each connector portion has two apertures formed therein, enabling the bracket 60 to be connected to four tensioned cables (not shown). Bracket base 66 is urged against the lips 20 by square washer 44 and nut 46, it being understood that a second nut is threaded to the lower end of the hanger rod 14 and is disposed below the bottom channel member wall 18.

Bracket 60 incorporates a bearing element 68 integrally connected to and extending downwardly from the bracket base 66. The bearing element 68 is positioned in the elongated opening of the channel member defined by the inturned lips 20 and extends into the interior of the channel member. The bearing element 68 engages the lips. In addition, a pair of bearing elements 70 are provided, one at each side of the slot of the bracket, each bearing element 70 (only one of which is illustrated) projecting downwardly from the bracket base. These bearing elements 70 also project downwardly through the elongated opening of the channel member and engage the inner surface of the lips to prevent relative rotational movement between the bracket 60 and channel member 12.

In this embodiment, washer abutment members or tabs 74 project upwardly from the upper side of the bracket base and are employed to engage washer 44 to prevent rotation of the washer relative to the bracket, providing additional stability and promoting ease of installation.

FIGS. 4 and 5 illustrate a third embodiment of bracket, bracket 76, which is the same in all respects as bracket 60 except for the absence of a bearing element in the nature of bearing element 68.

FIG. 8 shows another embodiment of the bracket, bracket 80. In this arrangement, the bracket incorporates first and second bearing elements 82, 84 which bear against the outer surfaces of the channel member side walls 16. The connector portions 90, 92 are enlarged end portions of a single plate projecting upwardly from one edge of the bracket base 94.

The invention claimed is:

1. In combination:

a structural element;

a structural member; and a bracket of integral construction connecting said structural member to said structural element and stabilizing the structural member against movement, said bracket comprising, in combination:

a bracket base defining a bracket base opening receiving the structural element and including a bracket base surface bearing against the structural member at a first location on the structural member;

a first connector portion extending away from said bracket base in a first direction and defining an aperture for interconnecting the first connector portion to a first stabilizing cable under tension;

a second connector portion extending away from said bracket base in a second direction and defining an aperture for interconnecting the second connector portion to a second stabilizing cable under tension; and a first bearing element connected to said bracket base and including a first bearing element surface bearing against the structural member at a second location on the structural member, said first bearing element surface being angularly disposed relative to said bracket base surface and for transferring force from said bracket to the structural member to prevent relative rotation between said bracket and the structural member, said structural element comprising a hanger rod and said bracket base comprising a plate having a plurality of plate edges, said bracket base opening comprising a slot open at one of the edges and extending inwardly therefrom, said slot enabling the bracket to be slid in place on the hanger rod from a side of the hanger rod.

2. The combination according to claim 1 wherein said bracket base comprises a double-sided plate, one of the sides of said plate comprising said bracket base surface bearing against the structural member and the other of the sides of the plate engaging a washer disposed above said plate.

3. The combination according to claim 2 wherein said bracket additionally comprises at least one washer abutment member projecting upwardly from the other of said sides engaging the washer to prevent rotation of the washer relative to said bracket.

4. The combination according to claim 1 wherein said first and second connection portions comprise connector plates integrally attached directly to opposed side edges of said bracket base and extending outwardly therefrom.

5. The combination according to claim 1 wherein said first and second connector portions comprise connector plates respectively integrally attached directly to said first and second bearing elements and extending outwardly therefrom.

6. In combination:

a structural element;

a structural member; and a bracket of integral construction connecting said structural member to said structural element and stabilizing the structural member against movement, said bracket comprising, in combination:

a bracket base defining a bracket base opening receiving the structural element and including a bracket base surface bearing against the structural member at a first location on the structural member;

a first connector portion extending away from said bracket base in a first direction and defining an aperture for interconnecting the first connector portion to a first stabilizing cable under tension;

a second connector portion extending away from said bracket base in a second direction and defining an aperture for interconnecting the second connector portion to a second stabilizing cable under tension; and a first bearing element connected to said bracket base and including a first bearing element surface bearing against the structural member at a second location on the structural member, said first bearing element surface being angularly disposed relative to said bracket base surface and for transferring force from said bracket to the structural member to prevent relative rotation between said bracket and the structural member, said bracket additionally comprising a second bearing element connected to said bracket base and spaced from said first bearing element, said second bearing element having second bearing element surface bearing against the structural member at a third location on the structural member, said second bearing member surface being angularly disposed relative to said bracket base surface and for transferring a force from said bracket to the structural member to prevent relative rotation between the bracket and the structural member, said structural element comprising a hanger rod and said structural member comprising a channel member having two side channel member walls, a bottom channel member wall and inturned lips at tops of the side channel member walls defining an elongated opening communicating with the interior of the channel member, said bracket base surface contacting the channel member inturned lips and said first and second bearing elements engaging the two side channel member walls.

7. The combination according to claim 6 wherein said structural element comprises a hanger rod and wherein said structural member comprises a channel member having two side channel member walls, a bottom channel member wall and inturned lips at tops of the side channel walls defining an elongated opening communicating with the interior of the channel member, said bracket base surface contacting the channel member inturned lips and said first bearing element projecting into the interior of the channel member through said elongated opening and bearing against said channel member inturned lips.

8. In combination:

a structural element;

a structural member; and a bracket of integral construction connecting said structural member to said structural element and stabilizing the structural member against movement, said bracket comprising, in combination:

a bracket base defining a bracket base opening receiving the structural element and including a bracket base surface bearing against the structural member at a first location on the structural member;

a first connector portion extending away from said bracket base in a first direction and defining an aperture for interconnecting the first connector portion to a first stabilizing cable under tension;

a second connector portion extending away from said bracket base in a second direction and defining an aperture for interconnecting the second connector portion to a second stabilizing cable under tension; and a first bearing element connected to said bracket base and including a first bearing element surface bearing against the structural member at a second location on the structural member, said first bearing element surface being angularly disposed relative to said bracket base surface and for transferring force from said bracket to the structural member to prevent relative rotation between said bracket and the structural member, said bracket additionally comprising a second bearing element connected to said bracket base and spaced from said first bearing element, said second bearing element having a second bearing element surface bearing against the structural member at a third location on the structural member, said second bearing member surface being angularly disposed relative to said bracket base surface and for transferring a force from said bracket to the structural member to prevent relative rotation between the bracket and the structural member, said structural element comprising a hanger rod and said structural member comprising a channel member having two side channel member walls, a bottom channel member wall and inturned lips at the tops of the side channel member walls defining an elongated opening communicating with the interior of the channel member, said bracket base surface contacting the bottom channel member wall and said first and second bearing elements engaging the two side channel member walls.

* * * * *